United States Patent
Fong et al.

(10) Patent No.: US 12,052,360 B2
(45) Date of Patent: Jul. 30, 2024

(54) SECURE APPARATUS ENABLED SECURE PLATFORM INTEGRATION

(71) Applicant: PPIP LLC, Chandler, AZ (US)

(72) Inventors: Michael Fong, Chandler, AZ (US); Neric Hsin-wu Fong, Tempe, AZ (US); Mohamad Ahmad Foustok, Parkland, FL (US); Ryan Mark Speers, Silver Spring, MD (US)

(73) Assignee: PPIP, LLC, Chandler, AZ (US)

( * ) Notice: Subject to any disclaimer, the term of this patent is extended or adjusted under 35 U.S.C. 154(b) by 316 days.

(21) Appl. No.: 17/518,228

(22) Filed: Nov. 3, 2021

(65) Prior Publication Data

US 2022/0141015 A1  May 5, 2022

Related U.S. Application Data

(60) Provisional application No. 63/109,328, filed on Nov. 3, 2020.

(51) Int. Cl.
*H04L 9/08* (2006.01)
*H04L 9/14* (2006.01)
(Continued)

(52) U.S. Cl.
CPC .......... *H04L 9/0894* (2013.01); *H04L 9/0825* (2013.01); *H04L 63/029* (2013.01); *H04L 63/0876* (2013.01)

(58) Field of Classification Search
CPC ....... H04L 9/0894; H04L 9/0825; H04L 9/14; H04L 63/029; H04L 63/0876;
(Continued)

(56) References Cited

U.S. PATENT DOCUMENTS

| | | | |
|---|---|---|---|
| 2009/0023475 A1* | 1/2009 | Chang | H04M 1/72409 455/557 |
| 2012/0032789 A1* | 2/2012 | Ichimaru | G06Q 20/3278 340/10.5 |

(Continued)

OTHER PUBLICATIONS

Platform independent overall security architecture in multi-processor system-on-chip integrated circuits for use in mobile phones and handheld devices, by Akselrod et al., published 2007 (Year: 2007).*

(Continued)

*Primary Examiner* — Vu V Tran
(74) *Attorney, Agent, or Firm* — Fernando & Partners, LLP

(57) ABSTRACT

In accordance with some embodiments, a secure modular apparatus providing a first platform for secure platform integration includes communication device(s) and a key store for storing encryption keys. The apparatus additionally includes a crypto engine operable to use the encryption keys for cryptographic operations. The apparatus also includes a controller and a housing arranged to at least partially support the communication device(s), the key store, the crypto engine, and the controller. The controller, via the communication device(s), exchanges encrypted messages prepared or processed by the crypto engine with a second platform provided by a personal communication device, where the second platform is distinct from the first platform and has a plurality of layers including at least one layer between a hardware layer and high level layers, and the encrypted messages control one or more of a hardware unit in the hardware layer and a component in the high level layers.

19 Claims, 12 Drawing Sheets

(51) Int. Cl.
*H04L 9/40* (2022.01)
*H04M 1/72409* (2021.01)

(58) Field of Classification Search
CPC ............ H04L 63/0485; H04L 63/0428; H04M 1/724092; H04M 2250/12
See application file for complete search history.

(56) References Cited

U.S. PATENT DOCUMENTS

| | | | |
|---|---|---|---|
| 2016/0350145 A1* | 12/2016 | Botzer | ................ G06F 9/45558 |
| 2020/0278892 A1* | 9/2020 | Nainar | .................... H04L 67/10 |
| 2021/0226955 A1* | 7/2021 | Fong | .................... H04L 63/101 |

OTHER PUBLICATIONS

Platform Independent Overall Security Architecture in Multi-Processor System-on-Chip ICs for Use in Mobile Phones and Handheld Devices, by Amon et al., published 2006 (Year: 2006).*

* cited by examiner

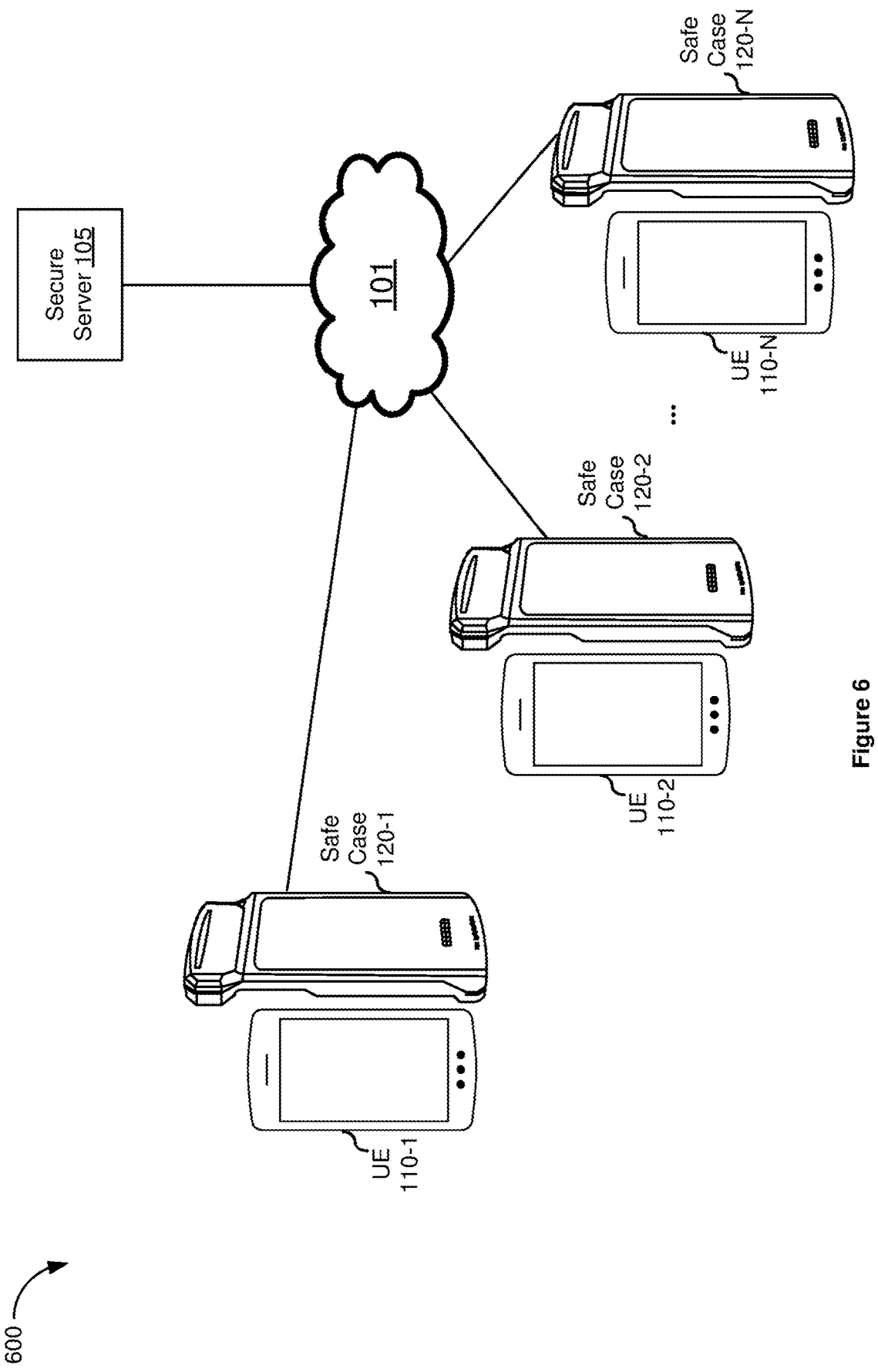

SECURE APPARATUS ENABLED SECURE PLATFORM INTEGRATION

PRIORITY CLAIM

This application claims priority to U.S. provisional patent application No. 63/109,328 filed on Nov. 3, 2020, the contents of which are hereby incorporated by reference.

TECHNICAL FIELD

This relates generally to the field of electronic device, and more specifically to an apparatus enabled secure platform integration.

BACKGROUND

A broad and complex set of hardware and software components make up most electronic devices. Many electronic devices have applications that run on top of an operating system, which further runs on top of firmware that controls the underlying electronic chips within the system (e.g., processors, memory, sensors, communication capabilities, etc.). Through the applications, such electronic devices often collect, store, or enable access to sensitive information. Electronic devices have thus become a target for bad actors who seek to compromise the devices and use the sensitive information for their own gain. Given the complexity of the components within these devices and the rapid rate of change, e.g., as driven by market forces that continually push companies to deliver new features and/or lower cost, manufacturers face a seemingly never-ending and uphill or even losing battle to secure their devices. The broader the attack surface and the faster the rate of change, the more difficult it is for security.

In the mobile device development ecosystem, special security techniques are forced to work within the control and limitations placed by major players, e.g., large original equipment manufacturers (OEMs) that make the mobile devices and/or the operating systems run on the devices. The constraints on the security feature development fundamentally limit the ability to secure mobile devices. Many defensive approaches, e.g., mobile device management (MDM) software or mobile threat defense (MTD) software, operate within sandboxes provided by the OEM or are only given partial access to the underlying operating system. Further, different mobile devices may be serviced by different providers and have different underlying operating systems. Naturally, some mobile devices are less secure than others. As such, when deploying the MDM or MTD platform across multiple mobile service providers and mobile operating systems, the loose coupling of the mobile devices to the MDM or MTD platform creates security risks.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIG. 6 is a block diagram of an exemplary integrated secure platform in accordance with some embodiments.

Figure 1:
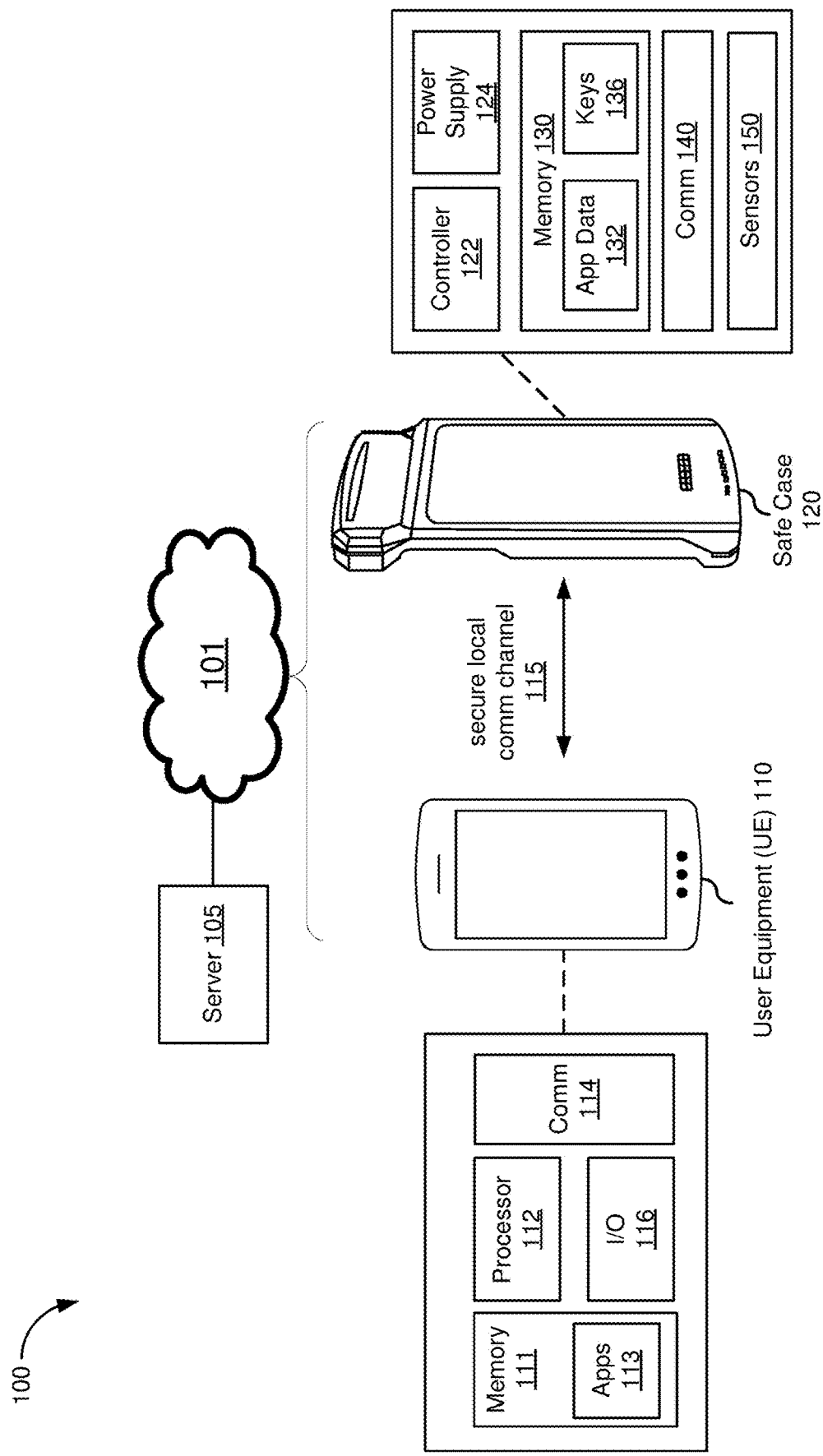
FIG. 1 is a block diagram of an exemplary security system in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

A novel approach to solving the aforementioned structural security problems is to pair a personal communication device with a secure apparatus that provides security-sensitive and diverse or supplemental services to the personal communication device. By implementing security functionalities on the secure apparatus, the personal communication device can continue to have a rapid rate of change and innovation without sacrificing security. The secure apparatus provides security functionalities and works in conjunction with the personal communication device to protect the personal communication device. As such, compromise of the personal communication device does not result in compromise of security functions such as digital and cryptographic key storage, security policy, identity, and/or authentication, etc., where such security functions have been offloaded to the secure apparatus.

In addition, the device-independent, yet paired secure apparatus can provide functionalities that may not have been contemplated, may not fit within, or may not be compatible with the personal communication device. Additionally, the secure apparatus works intelligently at the edge. As such, with secure storage and the ability to provide security functionalities and/or policy enforcement, the secure apparatus can either work in the absence of a network connection or work with cloud-based security and control systems. Offline operation (e.g., in the absence of having a network connection with a remote source) is critical in facilities and locations that have no or low network connectivity or have network connectivity blocked or service denied. In some embodiments, the secure apparatus also provides supplemental functionalities to the paired personal communication device for enhanced security, e.g., verifying location or other sensor data and/or monitoring electronic device performance, etc.

In some embodiments, a method is performed at an apparatus that includes a controller, one or more communication devices, and a key store for storing encryption keys used by one or more components in high level layers on a second platform that is distinct from a first platform provided by the apparatus, where the second platform has a plurality of layers including a security layer between a hardware layer and the high level layers. The apparatus additionally includes a crypto engine operable to use the encryption keys for cryptographic operations. The method includes, with the controller, via the one or more communication devices, exchanging encrypted messages prepared or processed by the crypto engine with the second platform, wherein the encrypted messages direct the security layer to control one or more of hardware units in the hardware layer and the one or more components in the high level layers. The apparatus further includes a housing, which at least partially supports the one or more communication devices, the key store, the crypto engine, and the controller in accordance with some embodiments.

In accordance with some embodiments, a device includes one or more processors, non-transitory memory, and one or more programs; the one or more programs are stored in the non-transitory memory and configured to be executed by the one or more processors, and the one or more programs include instructions for performing or causing performance of the operations of any of the methods described herein. In accordance with some embodiments, a non-transitory computer readable storage medium has stored therein instructions which, when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining", or "in response to detecting", depending on the context. Similarly, the phrase "if it is determined" or "if [a stated condition or event] is detected" is, optionally, construed to mean "upon determining", "in response to determining", "upon detecting [the stated condition or event]," or "in response to detecting [the stated condition or event]," depending on the context.

It should be appreciated that in the development of any actual embodiments (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

In accordance with various embodiments, an apparatus described herein enables secure platform integration for feature expansion. As used herein, the term "platform" includes, but not limited to, components, devices, layers, groups, functional blocks, and/or units, in the form of hardware, firmware, and/or software, so that the hardware and/or firmware components at the low level layer(s) support the associated operating system and/or a virtual environment at the high level layer(s), on which software modules are installed or run. As such, a platform often includes multiple layers forming a stack. In some embodiments, the apparatus includes hardware, firmware, and/or software units to enable a secure platform with secure features, such as communication, a chain of trust, and/or secure edge functions, etc. When integrating with another platform, the secure platform extends the secure features of the apparatus to other platforms. As a result, the security of the integrated platform in the integrated system is improved over a stand-alone system.

In particular, the apparatus (also referred to hereinafter as the "safe case", "smart case", "active case", "active base", "case", "computing device", or "device") includes security features, such as root of trust, authentication, data collector, secure communication of data, local or centrally controlled policy decisions and enforcements, modular backpack attachments for additional functionality, etc. The security features on the apparatus allow the apparatus to provide secure edge functions isolated from or in conjunction with a secure cloud. In some embodiments, the secure cloud aggregates data from a plurality of apparatuses and leverages its computational resources for added security, e.g., using machine learning for gating services based on policies and/or criteria (e.g., time, usage, context, etc.). In some embodiments, the apparatus has an application running on the personal communication device, to gather information from the electronic device. Such information can be used locally or forwarded to the apparatus or the secure cloud for policy decisions, monitoring the health and security of the device, among others. In some embodiments, the application also displays data from the apparatus or the cloud and forwards data between the apparatus and the cloud, thus leveraging the communication pathways available on the personal communication device. Accordingly, the apparatus and/or the secure cloud and/or the application form a secure platform that includes multiple and/or layers of hardware, software, and hardware components. When integrating the secure platform with another platform, the apparatus extends its security features and capabilities to the integrated platform.

For example, a device may have applications providing functions such as virtual machine, container, hypervisor, and/or trust zone. When such a device is integrated into the secure platform, the apparatus uses its root of trust for authentication and encryption, controls data and communication path, and communicates activities on the device and/or on the apparatus. Through the secure communication path, data are communicated to the secure cloud for aggregated analysis. As a result, when the two parallel and/or distributed platforms integrate, the secure apparatus enables secure integration and enhances the security of the integrated platform.

In another example, a personal communication device has sensors (e.g., microphones, cameras, GPS, inertial measurement units, biometrics sensors, etc.) and/or communication capabilities (e.g. cellular, Wi-Fi, BLE, NFC, radio, satellite, etc.). Such sensors and/or communication capabilities, if misused, can result in the loss of user data or entity data, e.g., the data being collected or exfiltrated from the personal communication device. When integrating such a personal communication device into the secure platform, the control of the sensors and/or communication capabilities by the personal communication device are partially or totally ceded in accordance with some embodiments. Instead, in some embodiments, the secure platform applies policies and enforces policy decisions to control the sensors and/or communication capabilities of the personal communication device. Accordingly, compromising the underlying personal communication device would not allow an attacker to bypass such protections.

In yet another example, the secure platform can enforce a policy of not allowing images or audio recorded inside a secure facility or a private home. To enforce such policy, in some embodiments, through the secure apparatus, the secure platform turns off or otherwise controls and/or monitors the microphones, cameras, and/or communication capabilities of the personal communication device, thus substantially raising the difficulty level for an attacker to maliciously perform undesired operations and enhancing security.

In accordance with some embodiments, an integrated system includes multiple independent, parallel, and/or distributed platforms, e.g., a first platform and a second platform where the second platform is distinct from the first platform. In some embodiments, the first platform includes one or more communication devices; a key store for storing encryption keys; a crypto engine operable to use the encryption keys for cryptographic operations; and a controller operable to, via the one or more communication devices, exchange encrypted messages prepared or processed by the crypto engine with the second platform, wherein the encrypted messages control one or more of a hardware unit in the hardware layer and a component in the high level layers.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram illustrating an exemplary security system 100 in accordance with some embodiments. In some embodiments, the security system 100 includes a user equipment (UE) 110 (also referred to hereinafter as "a user device" or "a personal communication device") and a safe case 120 that is a modular and distinct device from the UE 110. As used herein, a safe case is also referred to as an apparatus, a safe base, or a case. In some embodiments, the safe case 120 is connectable to a server 105 through a network 101. In some embodiments, the server 105 is a secure cloud that remotely monitors and/or controls the UE 110 via the safe case 120.

Accordingly, the server 105 is also referred to hereinafter as the secure server 105 or the secure cloud 105.

In some embodiments, the safe case 120 includes a housing arranged to hold the UE 110 (e.g., a smartphone, mobile device, wearable device, head-mounted device, tablet, laptop, computer, etc.). In some embodiments, the housing includes a plurality of components mateable with one another. The safe case 120 can have one or more moveable components (e.g., a hood) operable to, for example, slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure (partial or whole) that at least partially supports and holds the UE 110. In other words, the plurality of components of the safe case 120, once mated with one another, can form the housing assembly to receive, hold, mate with, and/or attach to the UE 110, so that the safe case 120 can electronically communicate with the UE 110. In some embodiments, the safe case 120 is a modular device, such that the housing of the safe case 120 allows the safe case 120 to be a distinct component to be attached and/or paired with the UE 110. For example, the safe case 120 can be an attachable puck to the UE 110.

When in certain position(s), the housing, along with other components of the safe case 120, protects the UE 110 against tracking or spying, e.g., by audio jamming, camera covering, and/or RF shielding, etc. Moreover, when in such positions, the safe case 120 provides a secure local application communication bridge for applications executing on the UE 110 in accordance with some embodiments. When the one or more moveable components of the housing assembly are in certain other position(s) (e.g., hood slid up), a user can take the UE 110, which is a distinct device as will be described in further detail below, out of the housing and place the UE 110 in a non-protected mode. In such positions, without the local application communication bridge, the UE 110 does not allow direct communication and/or application data sharing among applications executing on the UE 110, e.g., by ceasing to provide communication services to the application in accordance with some embodiments.

In some embodiments, the safe case 120 includes one or more communication devices 140 at least partially supported by the housing of the safe case 120. In some embodiments, the housing of the safe case 120 also at least partially supports the power supply 124, the memory 130, and/or the sensors 150. In some embodiments, the one or more communication devices 140 include one or more local communication devices, such as a WiFi modem, a BT/BLE radio, an infrared radio, an NFC radio, or a Lightning® (a registered trademark of Apple Inc., Cupertino, California) connector, etc., that are operable to provide a secure local communication channel 115 (e.g., wirelessly or via physical connection) between the safe case 120 and the UE 110. In some embodiments, the connections to and from the safe case 120 carry an end-to-end encryption to ensure security. In one direction, the secure local communication channel 115 carries information from the UE 110 to the safe case 120 for monitoring, validation, authentication, authorization, and/or permission. In the other direction, the secure local communication channel 115 carries information from the safe case 120 to the UE 110 for the control of activities on the UE 110 and/or to supplement the functionalities of the UE 110.

In addition to the local communication capability, the one or more communication devices 140 are also capable of remote communication with remote sources, e.g., the server 105, including but not limited to Global Positioning System (GPS), cellular communication, such as long term evolution (LTE), wideband code division multiple access (W-CDMA), code division multiple access (CDMA), time division multiple access (TDMA), or Global System for Mobile Communications (GSM), etc. In some embodiments, leveraging information exchanged with the server 105, the safe case 120 validates the communications on the UE 110 and bridges secure local application communication accordingly to validation results and/or policy configurations.

In some embodiments, the safe case 120 includes a non-transitory memory 130. In some embodiments, the non-transitory memory 130 includes at least one secure portion storing keys. In some embodiments, keys 136 are stored in the secure portion of the memory 130 and never leave the safe case 120. For example, trusted hash signatures for application execution are generated based on a hardware root of trust, e.g., using a specialized system and crypto architecture to create a root key. In some embodiments, the safe case 120 uses a hardware true random number generator and stores the root key in the secure portion of the memory 130, e.g., stored as part of the keys 136. As such, the root key, along with other keys 136, is not exposed to other devices and cannot be externally extracted. In some embodiments, the safe case 120 can also generate certificates, e.g., based on keys 136, in response to certificate signing requests. The certificates are used as the trusted hash signatures for applications and local application communications. Accordingly, an appropriate certificate bundle (e.g., a X.509 certificate bundle) can be produced, provisioned, and stored within the safe case 120 to maintain stringent control of allowed processes for execution and communication.

Though not shown in FIG. 1, in some embodiments, in addition to the secure keys 136, the memory 130 also stores application data for applications executing on the safe case 120 and/or on the UE 110. Having the application data stored on the safe case 120 has the advantage of allowing offline local application communications and allowing the safe case 120 to control when to supply the application data to the applications on the UE 110 and whether to supply the application data.

In some embodiments, the safe case 120 includes a controller 122 coupled to the communication device(s) 140. Embodiments of the controller 122 include hardware, software, firmware, or a combination thereof. For example, as described in further detail below, a part of the controller 122 can be a processor and a part of the controller 122 can be implemented as firmware hosting drivers and features such as a crypto engine for providing crypto services and/or key stores. The crypt services and/or key stores can then be used by applications for audio and/or video masking, assured identity, etc., where such applications can be implemented as software, firmware, or a combination thereof. In some embodiments, the controller 122 is operable to manage the secure local communication channel 115 between the UE 110 and the safe case 120. In addition to managing the secure local communication channel 115, the controller 122 logs data in a secure area of the safe case 120, e.g., in the secure part of the memory 130. Logging data in the secure area of the safe case 120 has the advantage of providing trustworthy status reports of the UE 110 for analysis in case the UE 110 is compromised. Particularly, many high-value enterprises invest significantly to implement tight monitoring and access control within their own networks, but lose visibility and control to external networks such as the cellular networks or WiFi hotspots. Once a smartphone is compromised, the status report from the operating system on the UE 110 may not be trustworthy. Instead, relying on the logged data in the secure area of the safe case 120, Enterprise Mobility Management (EMM) can obtain reliable status reports. EMM can then take action to limit the threat spread based on the reliable status reports.

In some embodiments, the safe case 120 also includes a plurality of sensors 150. In some embodiments, the plurality of sensors 150 collects information such as sound, light, temperature, chemicals, drug, smell, and/or biometrics measurements, etc. In some embodiments, the sensors 150 are coupled to the input/output interface, such that the information collected by the sensors 150 are passed to the controller 112 by the input/output interface for further processing. In some embodiments, the independent measurements by the sensors 150 are compared with the information obtained by the sensors on the UE 110 for validation. When the UE 110 is held by the safe case 120, due to the close proximity of the UE 110 and the safe case 120, e.g., the UE 110 being in contact with the housing of the safe case 120, the distance between the sensors 150 on the safe case 120 and the sensors on the UE 110 are less than a threshold, e.g., within the magnitude of millimeter. As such, the measurements by the sensors 150 reflect the sound, light, temperature, chemicals, drug, and/or smell of the operating environment of the UE 110 as well as the biometrics of the user of the UE 110 and/or RF emission status by the UE 110. Thus, the measurements by the sensors 150 can be used for validating the measurements by the sensors on the UE 110 to determine whether the UE 110 has been compromised and reported false information.

In some embodiments, the safe case 120 includes a power supply 124. The power supply 124 provides power to a peripheral interface (e.g., an interface to supplemental functional modular devices attachable to the safe case 120), the communication device(s) 140, and/or the controller 122. In some embodiments, the power supply 124 includes at least one of a battery, a charging socket, a USB connector, a power plug, and/or a power socket. In some embodiments, the power supply 124 includes a connector for a battery. Though not shown in FIG. 1, in some embodiments, the power supply 124 includes a plurality of power supplying components, e.g., one battery providing power to the local communication device 114 and/or a power plug providing power to the controller 122, etc. The plurality of power supply components can be connected so that they are charged together or separately. The plurality of power supply components can also aggregate power to supply to one or more hardware electronic components of the safe case 120. Alternatively, the plurality of power supply components can separately provide power to one or more hardware electronic components of the safe case 120.

In some embodiments, the UE 110 held by the safe case 120 includes a processor 112, one or more communication devices 114, an input/output interface 116, one or more sensors (not shown in FIG. 1), memory 111, and applications 113 (e.g., APIs that include instructions stored in the memory 111 and executed by the processor 112). In some embodiments, the UE 110 is a portable communications device, such as a mobile phone, a wearable device, a tablet, a laptop computer, a head-mounted device, a digital media player, a stylus, an electronic reader, or the like. In some embodiments, the UE is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 1 may not be mandatory and thus some may be omitted in certain embodiments. Additionally, some embodiments can include further or different components, devices or elements beyond those illustrated in and described with respect to FIG. 1.

In some embodiments, the processor 112 is coupled to the one or more communication devices 114 to manage the communication path through the one or more communication devices 114, in accordance with some embodiments. In addition to managing communication, the processor 112 processes data and executes applications 113, in accordance with some embodiments. In some embodiments, the processor 112 includes one or more chips and/or chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like. Although illustrated as a single processor, it will be appreciated that the processor 112 can comprise a plurality of processors. The plurality of processors communicates with each other and collectively performs one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the applications 113) to be executed by the processor 112. In some embodiments, the memory 111 exchanges information with one or more of the processor 112, the input/output interface 116, the one or more communication devices 114, or the sensors via a bus.

In some embodiments, the applications 113 stored in the memory 111 include a secure application to enable a secure application container. In some embodiments, the secure application facilitates data exchange between the UE 110 and an external electronic device (e.g., the safe case 120 and/or the server 105). The data exchange includes, for example, transmitting data or a portion of the data obtained by the communication device 114 and/or the sensors to an external electronic device (e.g., the safe case 120 and/or the server 105) or receiving data from the external electronic device, e.g., the instructions from the safe case 120 and/or server 105. Thus, the secure application facilitates the control of the UE 110 by the safe case 120.

Still referring to the UE 110, in some embodiments, the input/output interface 116 provides a channel for input/output data between the processor 112 and input/output peripheral devices, such as a display, a keyboard, a mouse, a pen, microphones, cameras, and/or speakers of the UE 110. In some embodiments, the peripheral devices are connected to the input/output interface 116 wirelessly, e.g., via the one or more communication devices 114.

In some embodiments, the one or more communication devices 114 connect the UE 110 and an external electronic device wirelessly or through a wired connection. In some embodiments, the external electronic device is the safe case 120, such that the one or more communication devices 114 connect to the safe case 120 wirelessly or through a wired communication. The wireless communication includes at least one of, for example, WiFi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, California) connector.

In some embodiments, the UE 110 includes sensors, such as one or more accelerometers, gyroscopes, and/or magnetometers (e.g., as part of an inertial measurement unit (IMU)) for obtaining information concerning the position (e.g., altitude) of the UE 110, light sensors, or acoustic sensors. In some embodiments, the sensors are coupled to the input/output interface 116, such that the information collected by the sensors are passed to the processor 112 by the input/output interface 116 for further processing. For example, the input device camera uses light sensors for light sensing. In some embodiments, the sensors are coupled to the one or more communication devices 114, such that the information collected by the sensors is transmitted to another device (e.g., the safe case 120) for validation. In some embodiments, the sensors are coupled to the power supply (e.g., a battery) of the UE 110 for obtaining the power level of the UE 110.

In some embodiments, the safe case 120 monitors the status of the communication devices 114, I/O devices 116, and/or the sensors on the UE 110. In some embodiments, a validation engine on the safe case 120 verifies the status of the microphones, camera, and/or RF isolation device when the UE 110 is in a protected mode. In some embodiments, when the UE 110 is held by the safe case 120, due to the close distance between the safe case 120 and the UE 110, e.g., within the range of millimeters, the safe case 120 is capable of obtaining the status from the UE 110 via the sensor(s), input/output device(s), and/or the communication device(s) 140 on the safe case 120.

For example, through the coupling of the communication devices 114 and 140, the safe case 120 can request and obtain the status of the microphones and camera(s) on the UE 110. In another example, using RF sensing and/or receiving devices on the safe case 120 (or another modular device attached to the safe case 120 for processing RF signals), the safe case 120 can measure the RF signals sent and/or received by the UE 110. Due to the close distance between the safe case 120 and the UE 110, the RF signal measurement is accurate with low interference.

In some embodiments, upon receiving the status of the camera on the UE 110, the validation engine checks the amount of light detected by the light sensors in order to determine whether the camera is properly covered. In some embodiments, upon obtaining the RF emission measurement by the safe case 120, the validation engine checks the amount of RF emission in order to determine the effectiveness of the RF isolation. In some embodiments, the validation engine on the safe case 120 obtains the execution status of the applications 113 and determines whether or not to establish a secure local application communication bridge to allow the exchange of information among the applications 113.

As shown in FIG. 1 and described above, the safe case 120 has built-in secure features to provide a secure platform. When integrated with another device, e.g., the UE 110, the safe case 120 maintains control and expands its security features to the integrated platform. It should be noted that the safe case 120 and the user equipment 110 are two independent, parallel, and/or distributed platforms with bi-directional communication for information sharing. Under the control of the safe case 120, the two platforms are paired so that the computational resources on the safe case 120 can supplement and/or replace the functionalities on the UE 110. Further, the services provided by the safe case 120 can be segregated and provided independently, e.g., in parallel to multiple applications, containers, and/or virtual machines (VMs), etc. on the UE 110. Additionally, the secure conduits from the safe case 120 can terminate beyond the edge of the UE 110 and reach into various sub-parts. As such, one safe case 120 can provide independent services to many independent tenants.

Figure 2:
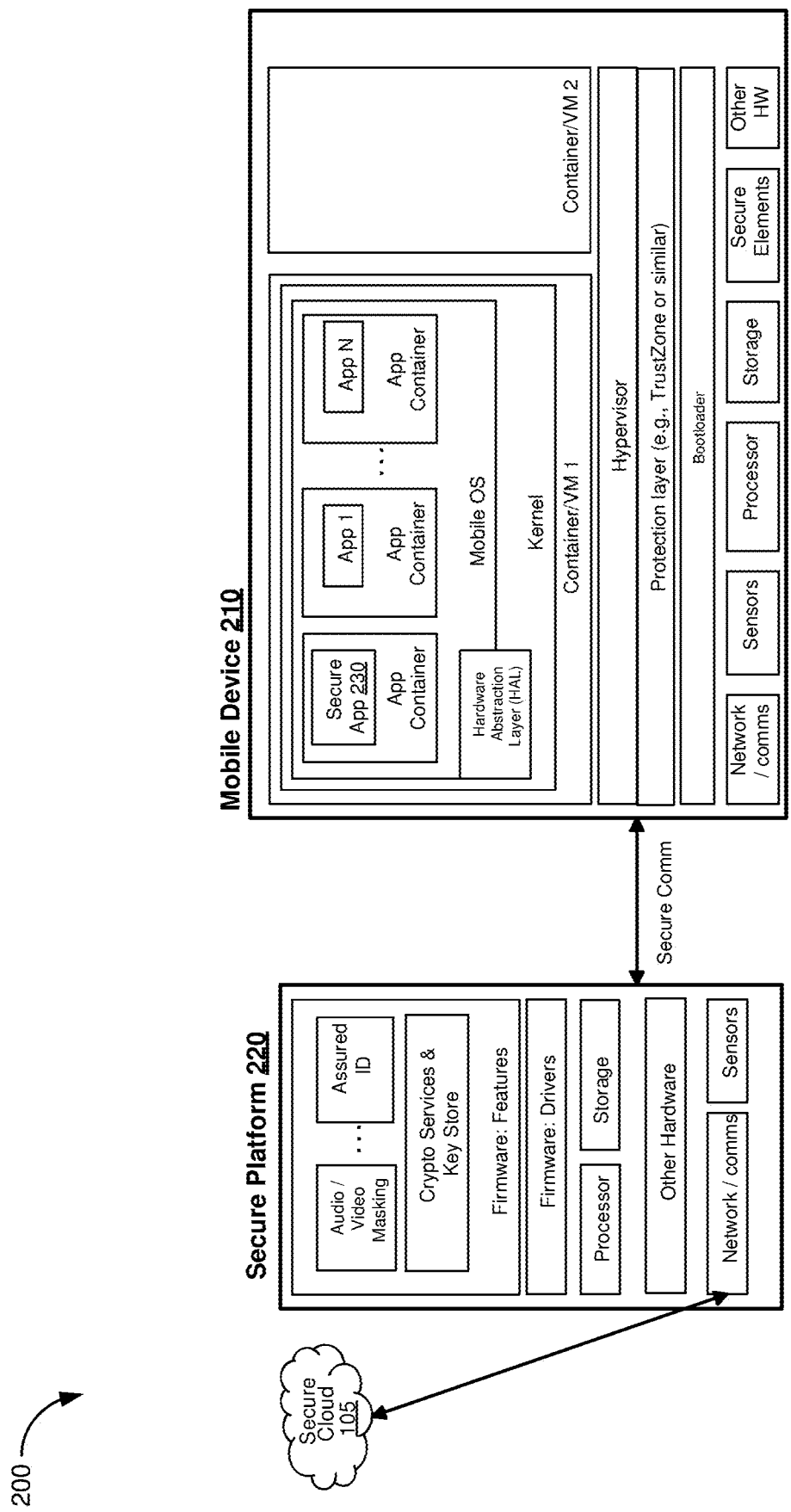
FIG. 2 is a block diagram illustrating an exemplary integrated security system with parallel and distributed platforms in accordance with some embodiments.

FIG. 2 illustrates an exemplary integrated security system 200, where a mobile device 210 (e.g., the UE 110, FIG. 1) is integrated with a secure platform 220 and leverages secure features on the secure platform 220 for security in accordance with some embodiments. As shown in FIG. 2, in some embodiments, a safe case, e.g., the safe case 120 in FIG. 1, provides the secure platform 220. Because the safe case provides layers in the secure platform 220, the secure platform 220 is also interchangeably referred to hereinafter as the safe case 220.

To provide the secure platform 220, the safe case includes multiple hardware units in one or more hardware layers, such as a processor 224 (e.g., the controller 112 in FIG. 1), one or more network communication devices 227 (e.g., the communication device(s) 140 in FIG. 1) for communicating with the mobile device 210 and/or the secure cloud 105, sensors 228 (e.g., the sensors 150 in FIG. 1) for independently sensing the operating environment, a storage 225 (e.g., a non-transitory memory) for storing data to share with the mobile device 210 (e.g., the non-transitory memory 130 in FIG. 1), and other hardware components 226. Further, the safe case also includes high level layer(s) for the secure platform 220, such as device drivers 223 and other firmware features 222, including a crypto engine 221 for providing crypto services and a key store. In some embodiments, the key store stores certificates and/or encryption keys for cryptographic operations. In some embodiments, the key store maintained by the crypto engine 221 stores the keys 136 (FIG. 1) in the secure portion of the memory 130 (FIG. 1). Additionally, among the high level layers of the secure platform 220, secure features are built into the hardware and the firmware, applications to provide audio masking, RF spoofing, geofencing, secure communication, assured identity, and/or security validation for security and privacy protection.

In FIG. 2, an exemplary mobile device (e.g., the UE 110 in FIG. 1) provides a parallel platform 210 distinct from the secure platform 220. Because the mobile device provides layers in the parallel platform 210, the parallel platform 210 is also interchangeably referred to hereinafter as the mobile device 210. To provide the parallel platform 210, the mobile device includes multiple hardware units in one or more hardware layers, such as network communication components 211 (e.g., the communication device(s) 114 in FIG. 1), sensors 212, a processor 213 (e.g., the processor 112 in FIG.

1), a storage 214 (e.g., the memory 111 in FIG. 1), secure elements 215, and other hardware components 216. On top of the hardware layer, the exemplary mobile device 210 includes layers such as bootloader(s) 217, protection layer(s) 218 (e.g., TrustZone or similar), a hypervisor 219, and/or other virtual layers as high level layers. In some embodiments, the high level layers include virtual machine container(s)) 231 (e.g., container/virtual machine 1 231-1, container/virtual machine 2 231-2, etc.), a kernel 232, a mobile operating system (OS) 233, a hardware abstraction layer (HAL) 234, and/or a plurality of application containers 235 (e.g., application container 1 235-1, application container 2 235-2, . . . , application container M 235-M). In some embodiments, each application container 235 hosts one or more applications, e.g., application container 1 235-1 hosting a secure application 230 for communication with the secure platform 220, application container 2 235-2 hosting application 1 236-1, application container M 235-M hosting application N 236-N, etc. In some embodiments, the secure application 230 is communicatively coupled with the secure platform 220. Via the encrypted messages from the secure platform 220, the secure application 230 communicates with the hypervisor 219 to allow the secure communication between the secure application 230 and the secure platform 220, e.g., including the secure messages passing through the secure application 230 to reach the hypervisor 219 and/or the secure messages passing through the hypervisor 219 to reach the secure application 230.

When the mobile device 210 is integrated with the secure platform 220, e.g., by inserting the mobile device 210 into the housing of the safe case and/or communicatively coupled or paired with the safe case 220, secure features on the secure platform are extended to the integrated platform including the platform the mobile device 210 resides on. For example, with the sensors 228 on the safe case 220 collecting sensor data independent of device sensors on the mobile device 210, the location services on the mobile device 210 are periodically validated by the secure platform 220 and the secure platform 220 serves as a supplemental check to geofence services on the mobile device 210. Accordingly, the sensors 228 on the secure platform 220 supplement the sensors on the mobile device 210 at the hardware level. Moreover, with the independent measurements by the sensors on the secure platform 220, even if the mobile device 210 is compromised, the geolocation of the integrated system 200 can be determined accurately. As such, location services for geofencing can be moved off of the mobile device 210. Accordingly, the sensors 228 on the secure platform 220 can replace, verify, and/or supplement the sensors 212 on the mobile device 210, and the location services in the integrated platform 200 are made more secure.

In another example, due to the close proximity between the mobile device 210 and the secure platform 220, audio masking and/or RF jamming by the secure platform 220 can detect, modify, and/or disrupt audio and/or RF signals received by the microphones and/or antennas on the mobile device 210. Further, in some embodiments, when the hood of the safe case is lowered, the cameras on the mobile device 210 can be covered. As such, certain audio, video, and/or RF functions on the mobile device 210 can be restricted and/or modify for security enhancement.

As shown in FIG. 2, the integrated security system 200 includes two platforms. The first platform is provided by the safe case 220 with multiple layers, e.g., in a first stack from low level hardware layer represented by various hardware units 224-228 to high level firmware layer represented by various firmware units 221-223 hosting security applications such as masking and/or assured identity, etc. And the second platform is provided by the mobile device 210, e.g., in a second stack from low level hardware layer represented by various hardware units 211-216 to at least one security layer (e.g., the hypervisor 219 and/or the protection layer 210, etc.) in the middle and then to high level layers such as virtual machines 231 and/or the application containers 235. These two platforms run in parallel and each has its own security features running through multiple layers in the respective stack. When these two platforms are integrated, the secure features on the safe case 220 extend the protection to the mobile device 210 while allowing the secure features on the mobile device 210 to run in parallel, e.g., including enabling, disabling, supplementing, or replacing at least one feature in the hardware layer and/or the high level layers.

In the integrated security system 200, certain functions can be distributed over the parallel platform 210 and the secure platform 220 through the communication and coordination between the two platforms 210 and 220. For example, at least a portion of the key storage, data storage, encryption, crypto engine, and/or data transports (e.g., Wi-Fi, cell, and/or tactical radio waveform, etc.), and/or processing (edge processing) by the mobile device 210 can be offloaded to the secure platform 220. In another example, the safe case 220 or the mobile device 210 can use the communication device(s) 227 or 211 to communicate with the secure cloud 105 and such communications as will be described in further detail below are subject to the security and/or policies enforced by the secure platform 220 facilitated by the security layer(s) on the parallel platform 210. Further, mobile device management and mobile threat defense integration and functionality provided by the secure platform 220 can also be extended to the mobile device 210, e.g., by installing and executing the secure application 230 on the mobile device 210. By expanding the secure features from the secure platform 220 to the integrated system 200, the secure platform 220 and the mobile device 210 can run in parallel and/or distributed. In another example, the exemplary mobile device 210 can have the hypervisor 219 that aims to tackle the problem of ensuring the integrity of the kernel 232 during runtime. As such, in the integrated system 200, the parallel platform 210 can still run the hypervisor 219 for security and in parallel, the secure platform 220 coordinates with the hypervisor 219 to enhance security.

It should be noted that the exemplary system 200 shown in FIG. 2 is not exhaustive or limiting. Other manifestations of architecture can be used in place or in conjunction with the components shown in FIG. 2. For example, the HAL 234, the application containers 235, or other mechanisms may or may not exist on the mobile device 210. The kernel 232 and the OS 233 may be separate or combined in a monolithic architecture. Further, communications to the secure cloud 105 can be sent from either the mobile device 210 or the safe case in the secure platform 220. The secure cloud 105 may be any server or set of servers, including a remote server or a local server installed on-premise. Additionally, on the mobile device 210, a trusted execution environment (TEE) may be initialized, optionally based on hardware support, e.g., by the hardware verifying the bootloader 217, the bootloader loading the protection layer 218, and/or the protection layer 218 loading a verified hypervisor 219, etc.

FIGS. 3A-3D illustrate various exemplary communication pathways associated with the hypervisor 219 in parallel and distributed platforms 300A-300D in accordance with some embodiments. These communication pathways allow control instructions to reach low level layers on the mobile device 210 (e.g., via the hypervisor 219 to various hardware units in the hardware layer). Extending the control to the low level layers prevents an attacker who has attacked the upper layer(s) (e.g., the secure application 230, the mobile OS 233, and/or the kernel 232, etc.) from controlling the low level layers. Further, the communications from the secure platform 220 to the hypervisor 219 are encrypted and signed, thus preventing the attacker who has compromised component(s) in the higher level layers from intercepting or changing the control or policy enforcement commands from the secure platform 220 over components in the hardware layer (e.g., turning off microphones, cameras, radios, etc.).

Figure 3A:
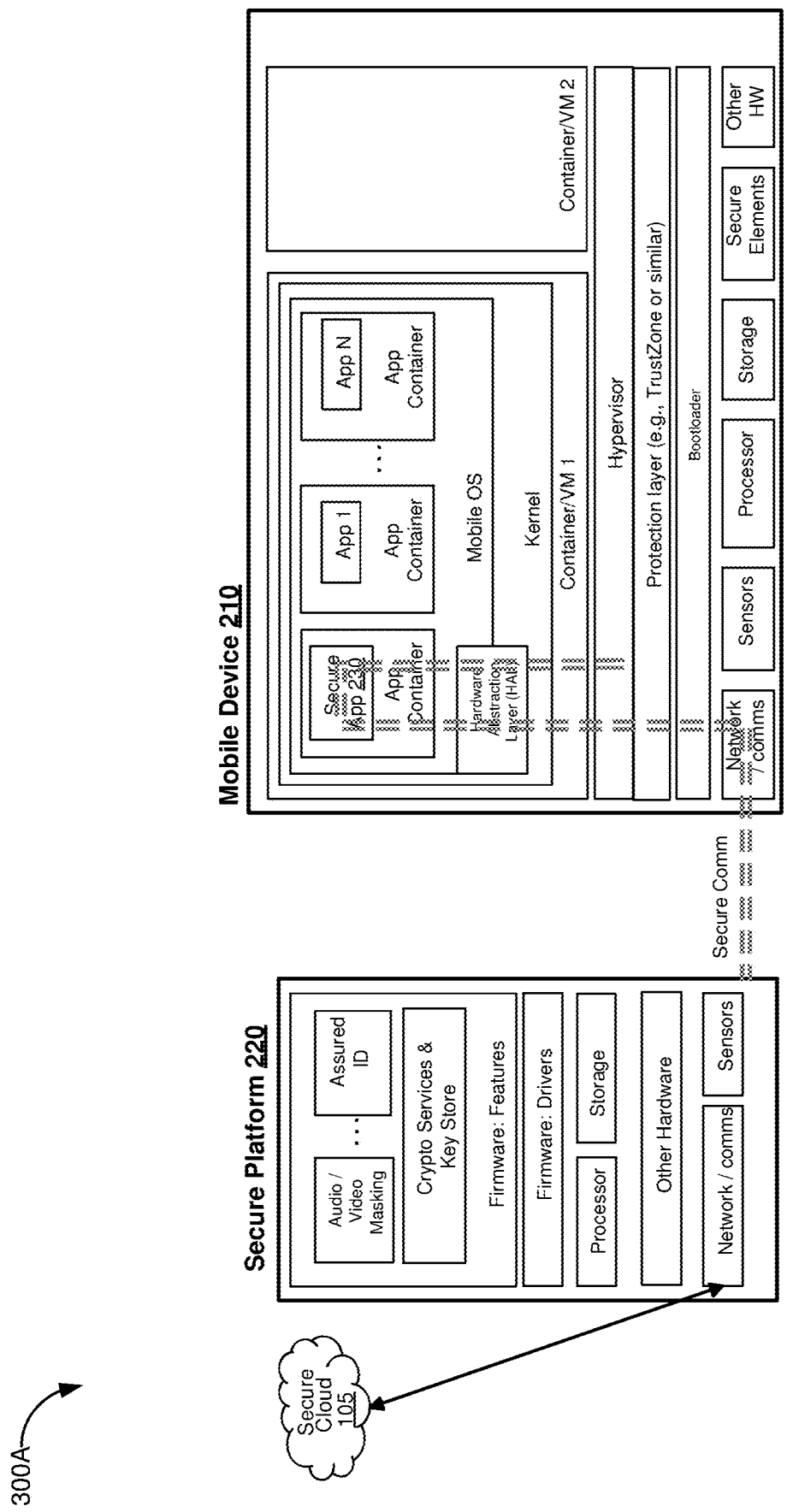
FIGS. 3A-3D are diagrams illustrating various communication pathways in the exemplary integrated security system in accordance with some embodiments.
Figure 3B:
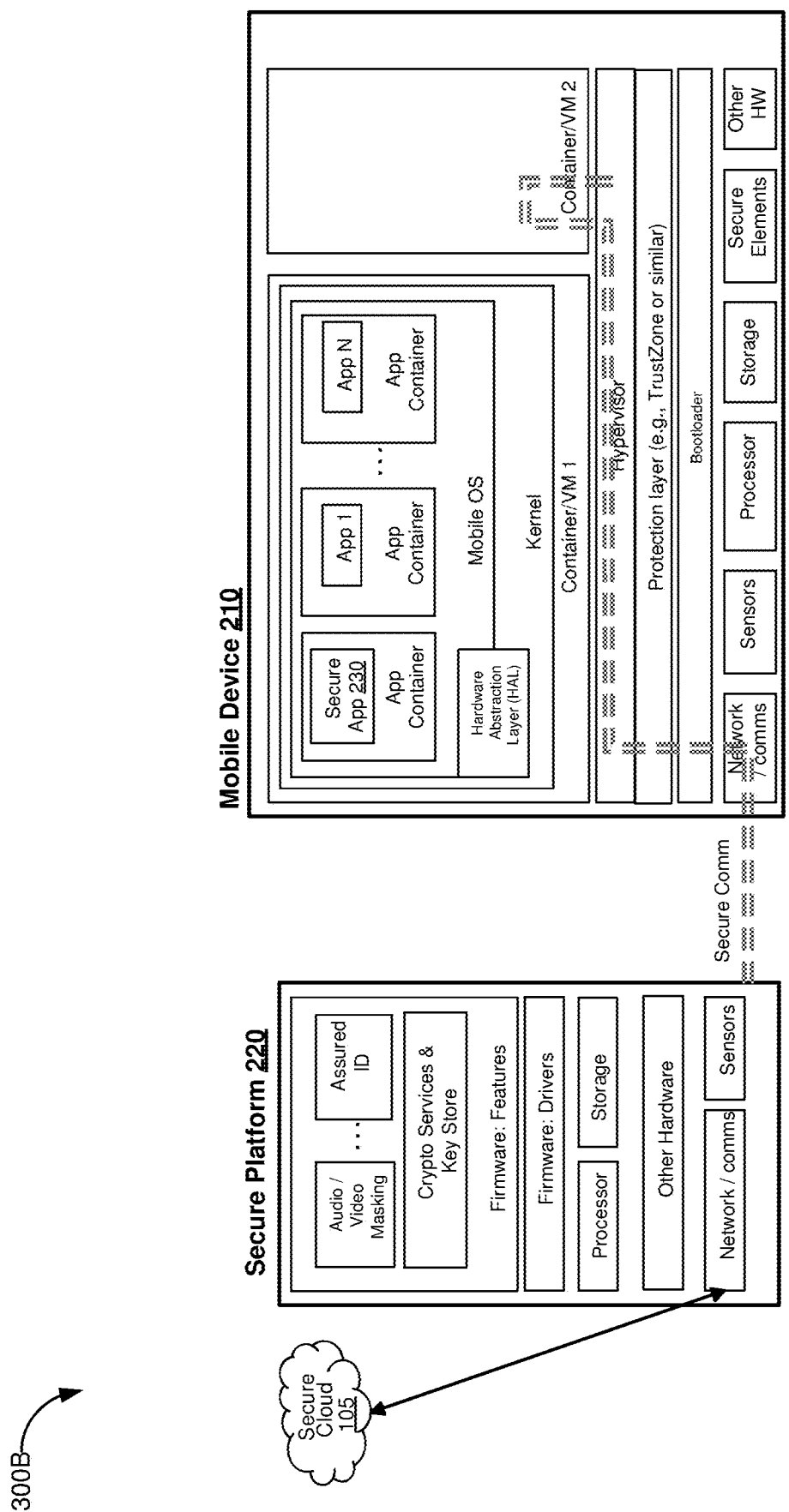

As indicated by the dashed line in FIG. 3A, a secure communication (e.g., with encrypted messages) from the hypervisor 219 on the mobile device 210 can communicate up the stack via wired or wireless connection to the secure application 230 and then pass down to the hypervisor 219, possibly passing the HAL 234, the OS 233, and/or the kernel 232 (e.g., for BLE and/or other drivers embedded in Linux kernel), before reaching the network communication devices 211 on the mobile device 210 to securely communicate with the secure platform 220. By allowing the communication pathway shown in FIG. 3A, the secure application 230 facilitates the control of the mobile device 210 by the safe case 220.

In another example, on many mobile platforms, the hypervisor 219 provides various levels of abstraction by enabling the virtual machine(s)/containers 231. The hypervisor 219 is responsible for creating and managing the virtual machine(s)/container(s) 231 and allows instructions from the virtual machine(s)/container(s) 231 to be executed correctly on the hardware in the lower level hardware layer. Additionally, the hypervisor 219 allows virtualized and shared I/O, including virtualized and shared network communication devices and/or sensors. As indicated by the dashed line in FIG. 3B, when the hypervisor 219 communicates to a particular virtual machine and/or container 231, the virtualization by the hypervisor 219 is securely communicated to the secure platform 220 via the secure communication channel between the safe case 220 and the mobile device 210. In some embodiments, the encrypted messages carried by the secure communication channel include at least one message passing through a respective virtual machine/container 231 to communicate with the security layer(s) including the hypervisor 219.

Figure 3C:
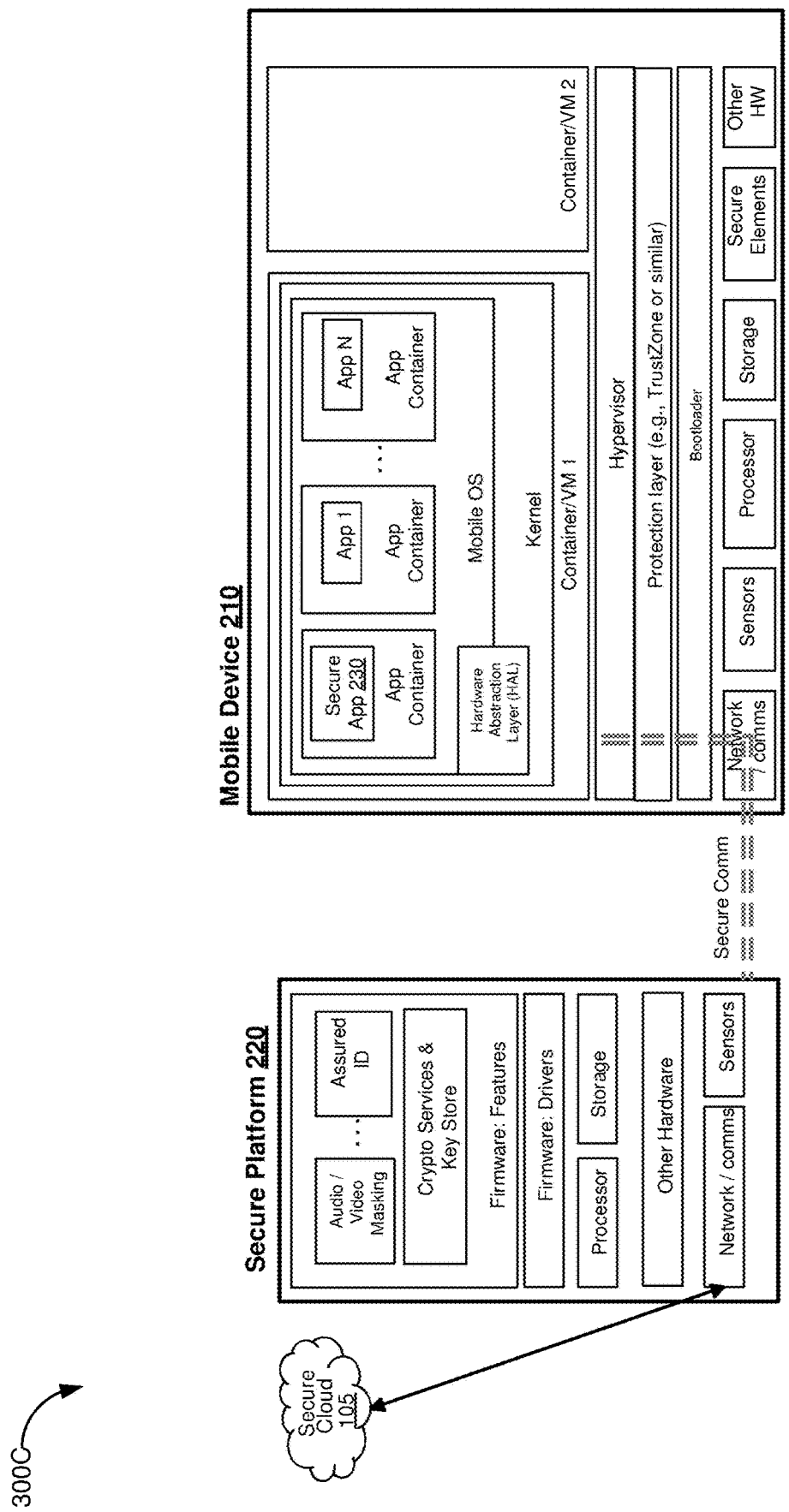
Figure 3D:
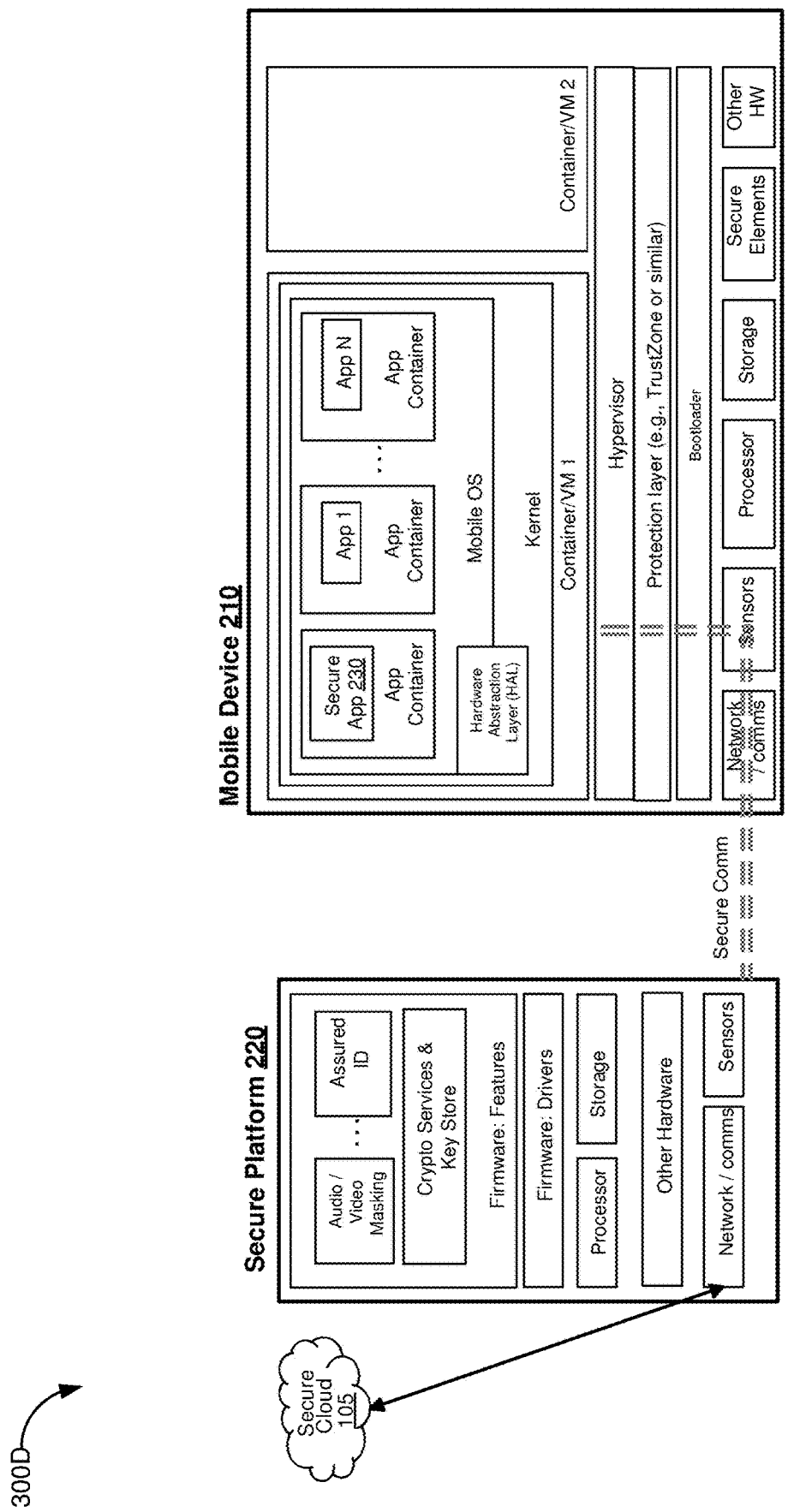

In some embodiments, when the hypervisor 219 interacts with the network devices 211 as shown in FIG. 3C and with the sensors as shown in FIG. 3D, the hypervisor 219 securely communicates to the secure platform 220, so that the secure platform 220 can provide or receive data, policy, control to or from the hypervisor 219 to enhance security. For example, in FIGS. 3C and 3D, the safe case 220 uses the communication devices 227 and/or the sensors 228 on the safe case 220 to monitor the status of the communication devices 211 and/or the sensors 212 on the mobile device 210, e.g., through RF sensing, measuring light, sound, etc. Further, the safe case 220, by exchanging encrypted messages with the parallel platform 210, directs the hypervisor 219 to obtain the communication data and/or sensor data from the mobile device 210.

In FIG. 3C, in some embodiments, also through the encrypted messages, the safe case 220 directs the hypervisor 219 to control the communication devices 211, e.g., by disabling the communication devices 211 or redirecting communications associated with the communication devices 211 for the protection of the mobile device in case of detecting potential compromise. As such, in some embodiments, via the encrypted messages passing through the communication device(s) 211, the secure platform 220 can communicate with the security layer without transiting through any of the high level layers. In some other embodiments, via the encrypted messages, at least one encrypted message directs the security layer to control or monitor the communication device(s) 211, e.g., disabling the communication device(s) 211 and/or redirecting communications associated with the communication device(s) 211.

In FIG. 3D, the sensors 228 independently take measurements and collect sensor data. In some embodiments, the encrypted messages through the secure communication channel direct the hypervisor 219 to control the sensors 212 of the mobile device 210. For example, the safe case 220 can obtain the sensor data collected by the sensors 212, compares with the sensor data independently collected by the sensors 228 to validate the sensor data. In some embodiments, based on the comparison result, the encrypted messages can further direct the hypervisor 219 to supply the more accurate sensor data from the sensors 228 to the high level layers on the parallel platform 210, effectively replacing the sensor 212 with the sensors 228 in some embodiments. In some embodiments, the encrypted messages can further direct the hypervisor 219 to supply at least a subset of the sensor data from the sensors 228 to the high level layers on the parallel platform 210 in addition to the sensor data from the sensors 212, thus supplementing the sensors 212. As such, via the encrypted messages and/or facilitated by the security layer(s) (e.g., the hypervisor 219), the security platform 220 can control the sensor(s) 212, including disabling the sensor(s) 212, so that the sensor data obtained by the sensor(s) 228 can be used to replace, verify, and/or supplement the sensor(s) 212.

In the integrated systems 300A-300D, the services from the secure platform 220 can work in parallel, independently, and/or supplementally along with any part(s) and/or sub-part(s) of the ecosystem including the safe case 220, the mobile device 210, and/or the secure cloud 105. FIGS. 4A-4D illustrate various exemplary service collaboration and interactions on parallel and distributed platforms 400A-400D in accordance with some embodiments. For example, in FIG. 4A, during the provision of the mobile device 210 and/or authentication of a user of the mobile device 210, the assured identity from the secure platform 220 can be used for analyzing identity traits, comparing identities, and/or decision making In particular, in some embodiments, as described above with reference to FIG. 3D, the device sensors 212 on the mobile device 210 collects a first set of identity trait data associated with a user of the mobile device 210, and the sensors 228 on the secure platform 220 independently obtain a second set of identity trait data of the user for authentication of the user by the secure platform 220. With the hypervisor 219 facilitating the encrypted message exchanges and/or the control, the first set of identity trait data and/or the second set of identity trait data are then used by the assured identity module from the secure platform 220 to authenticate the user. As such, the assured identity module and/or the sensors 228 on the secure platform 220 enhance the authentication capability offered by the parallel platform 210, and the attestation and controls by the hypervisor 219 allow the secure platform 220 to extend its security features such as assured identity to the integrated system 400A. As such, the mutual authentication engines on the secure platform 220 and the parallel platform 210 minimize authentication gaps and improve usability.

Figure 4A:
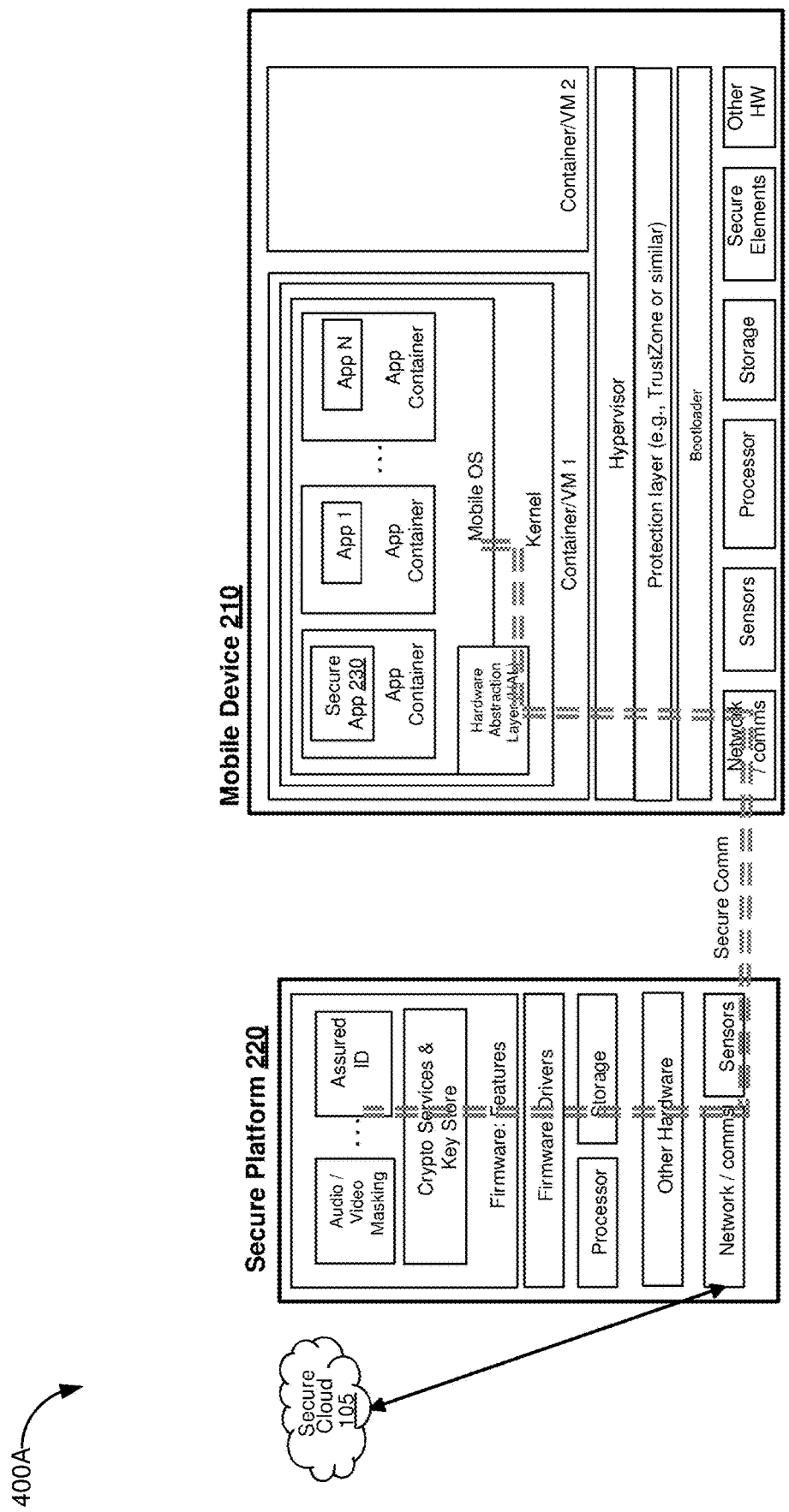
FIGS. 4A-4D are diagrams illustrating various exemplary service collaboration and interactions on parallel and distributed platforms in accordance with some embodiments.
Figure 4B:
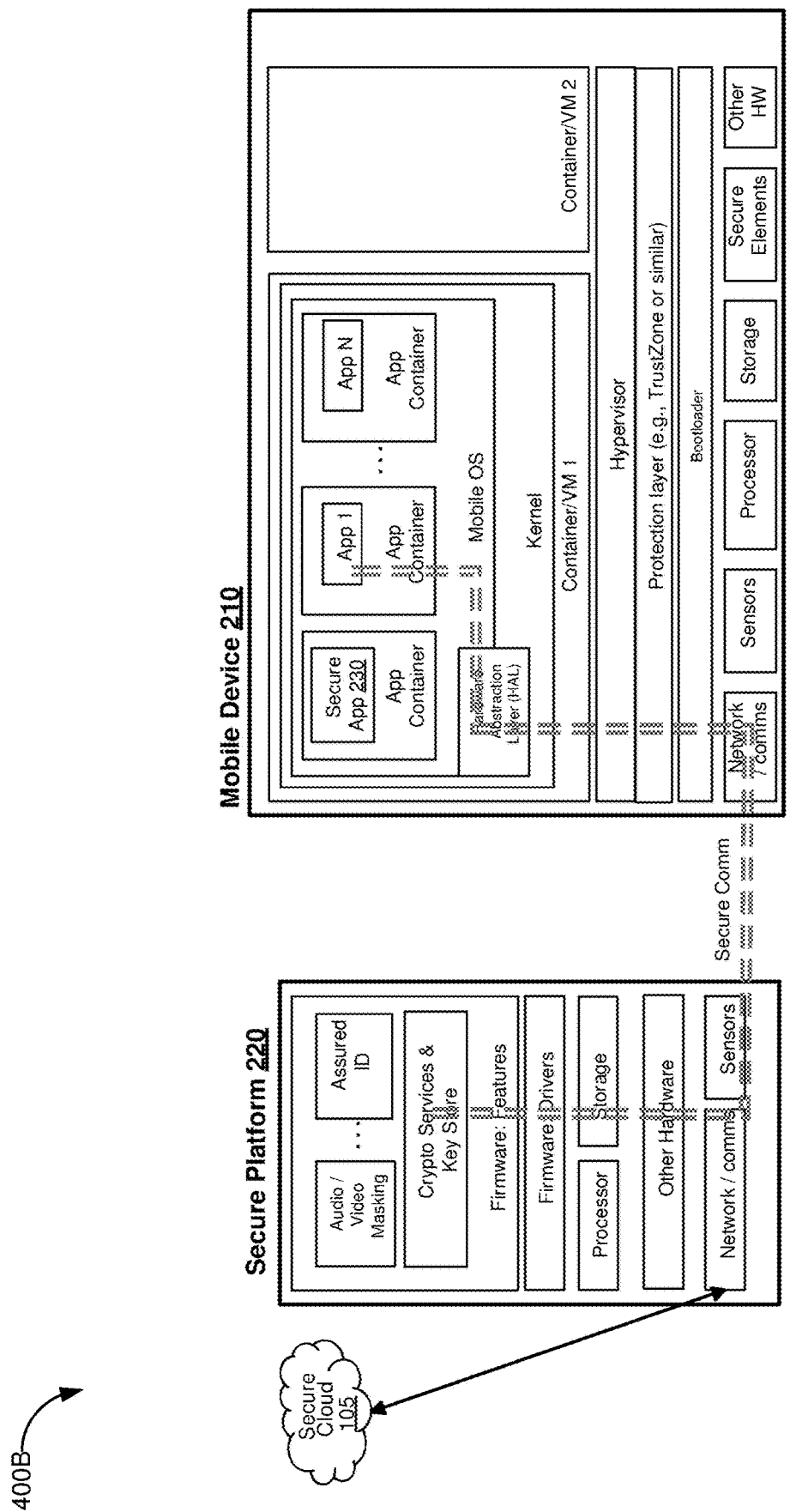

In FIG. 4B, the crypto engine 221 use encryption keys in the key store on the secure platform 220 to perform cryptographic operations for controlling the access, code validation, and attestation of the applications 230 and 236 on the mobile device 210 as well as secure communication (e.g., secure tunnels and/or VPN), security validation of the mobile device 210 (e.g., periodic measurement of the mobile device 210). As indicated by the dashed line in FIG. 4B, a secure communication (e.g., with encrypted messages) from the hypervisor 219 on the mobile device 210 can communicate up the stack via wired or wireless connection to application 1 236-1 in application container 235-2 and pass down to the hypervisor 219, possibly passing the HAL 234, the OS 233, and/or the kernel 232, before reaching the network communication devices 211 on the mobile device 210 to securely communicate with the secure platform 220. On the safe case 220, the crypto engine 221 uses the keys or signatures on the safe case 220 to validate application 1 235-1, e.g., allowing processes for execution and/or allowing access to application data used by application 1 235-1.

For example, application 1 235 can be an email application. By binding the email application to external key(s) controlled and maintained by the secure platform 220, the keys used by the email application are gated by the secure platform 220 subject to the security state, policy, and access decision from the secure platform 220. Further by storing the keys used by the mobile device 210 on the secure platform 220, the safe case 220 acts as a generic smartcard for on-device cryptographic operations by the mobile device 210. As such, the crypto engine 221 is used by the mobile device 210 as the storage backing for the key stores on the mobile device 210, thus reducing the threat surface for on-device key store attacks.

Further as shown in FIG. 4B, the hypervisor 219, when processing the data along the communication pathway can check the integrity and the operational status of the kernel 232 and/or the OS 233 during run time, e.g., the kernel status and/or the OS status, and at the same time, communicate securely with the secure platform 220. In the integrated system 400B, in some embodiments, secure boot and platform attestation of the mobile device 210 can use the keys stored in the key store 221 on the secure platform 220. In other words, via the encrypted messages, the secure platform 220 controls the initialization of various components of the mobile device 210 using the encryption key(s) stored in the crypto engine 221 in place of or in conjunction with the key(s) stored on the mobile device 210, e.g., initializing the bootloader 217 coupled with the hardware layer, the container layer 231, the kernel layer 232, the OS layer 233, the application container layer 235, and/or the application(s) 230 and 235, etc. The separation of secrets enhances security and ensures both platforms 210 and 220 are available during initialization, especially at boot time.

In some embodiments, to protect the secure communication, the cryptographic operations performed by the crypto engine 221 include using the encryption key(s) to form an outer layer of a secure tunnel used by the parallel platform 210 to communicate with a remote source. For example, when the mobile device 210 communicates with a remote server (e.g., the secure cloud 105), an inner layer of the secure tunnel and/or VPN tunnel is formed between the mobile device 210 and the remote server. With the crypto engine 221, an outer layer of the secure tunnel and/or VPN tunnel can be formed to further protect the communication between the mobile device 210 and the remote server. Because the hypervisor 219 allows modification of the communication pathways associated with the communication devices 211, re-routing the communication pathway to the secure platform 220 as shown in FIG. 4B and adding the extra layer of protection enhance security.

It should be noted that the security enforcement by the secure platform 220 does not require remote communication capability. For example, when the processor 224 detects the remote communication device among the communication devices 211 and/or the remote communication device among the communication devices 227 are disconnecting from a remote server (e.g., the secure cloud 105), the processor 224 can continue control the hardware layer and/or the high level layers (e.g., facilitated by the hypervisor 219) to enforce policy and/or security configurations in the layer(s) on the parallel platform 210, e.g., enforcing policies and/or security configurations stored in the storage 225 and/or the key store in the crypt engine 221 and enforcing such policies and/or configurations. As such, with secure storage and the ability to provide security functionalities and policy enforcement, the safe case 220 can work in the absence of a network connection to enforce security features, e.g., audio or video masking, assured identity, verifying location or other sensor data, and/or monitoring the performance of the mobile device 210, etc.

Figure 4C:
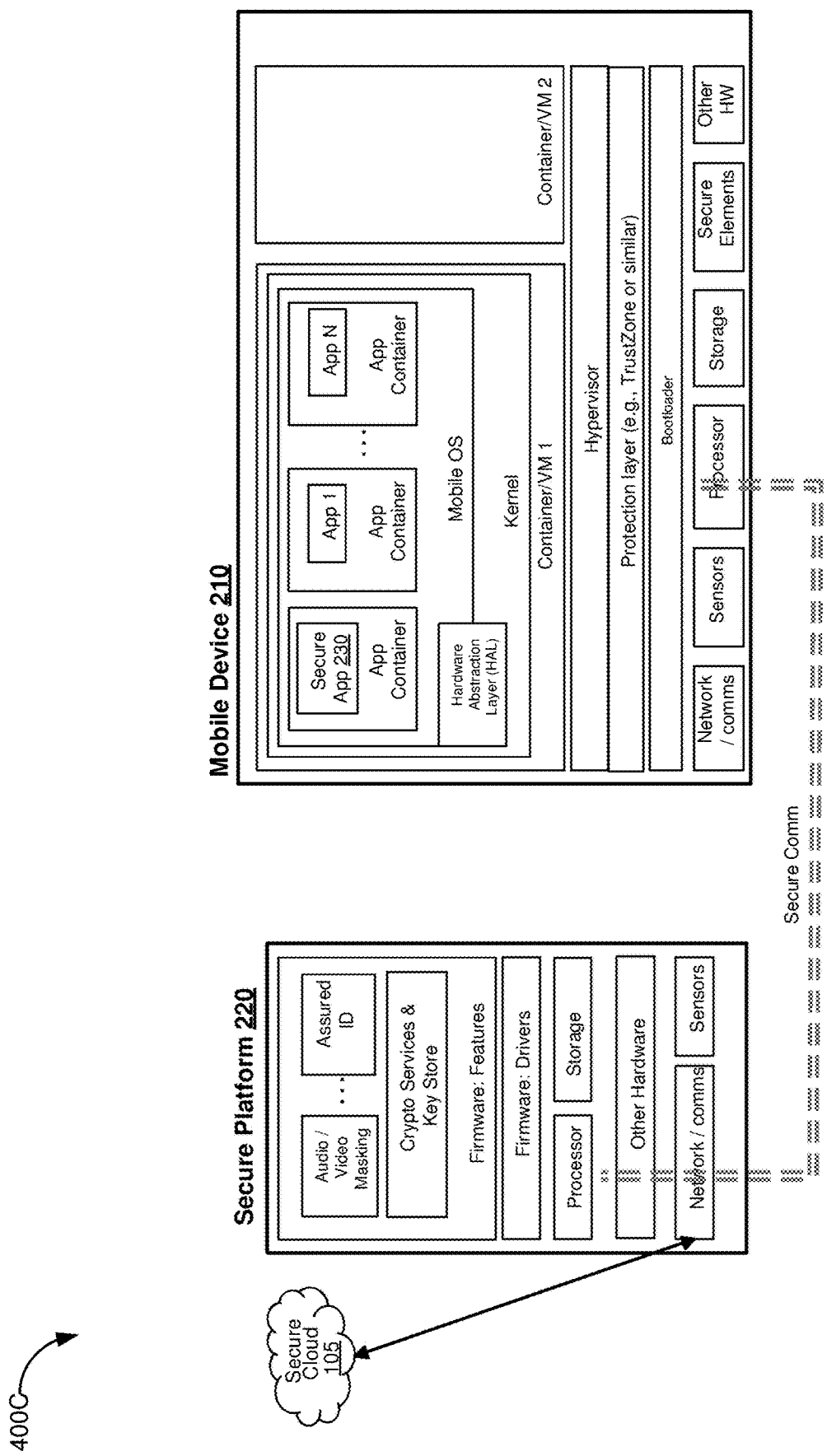

In FIG. 4C, the dashed line indicates that the mobile device 210 can offload at least a portion of its processing to the secure platform 220. In such embodiments, the encrypted messages exchanged between the secure platform 220 and the parallel platform 210 include at least a message directing the processor 213 to offload at least a portion of processing on the parallel platform 210 by the processor 213 to be executed on the secure platform 220, e.g., by the processor 224. In some embodiments, the encrypted messages direct the security layer(s) to allow such offloading. As such, the security layer(s), e.g., the hypervisor 219, facilitate the control of the processing by the processor 213.

Figure 4D:
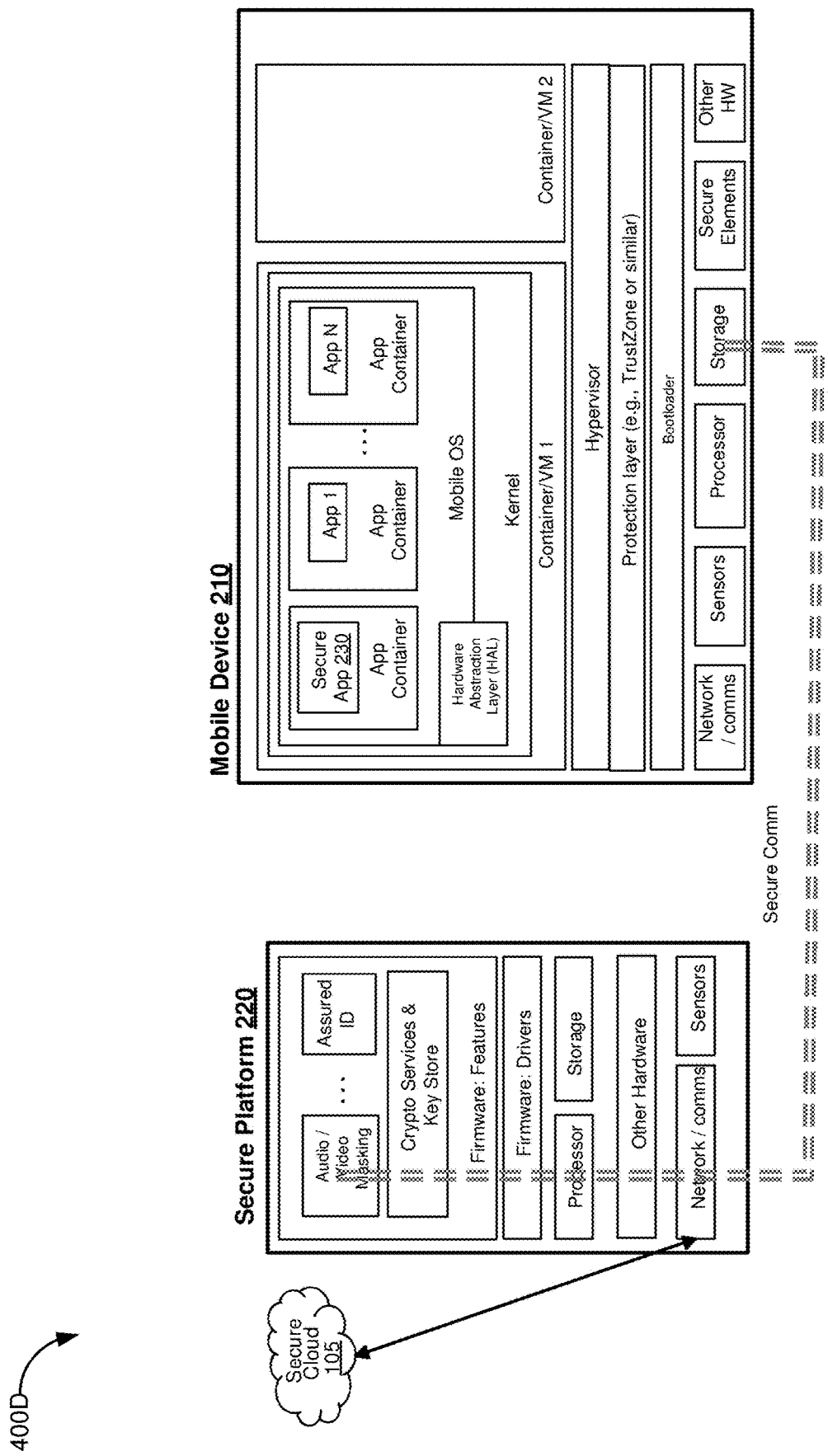

In FIG. 4D, the dashed line indicates that at least a portion of the data storage 214 on the mobile device 210 can be offloaded to the secure platform 220, and the secure platform 220 validates the data from the mobile device 210 as well as controlling access to the data for enhanced security. For example, the storage 214 can store application data used by layers above the hardware layer on the mobile device 210. According to the encrypted messages, the application data from the storage 214 can be accessed and/or modified by the secure platform 220. In some embodiments, the encrypted messages direct the hypervisor 219 to allow the storage offloading. As such, the secure platform 220 has direct control over the application data access and/or the application data used by high level layers. Further, the secure platform 220 has control over any hardware unit in the hardware layer, including, but not limited to the microphone (acoustic sensors as part of the sensors 212), the camera (e.g., light sensors as part of the sensors 212), the storage 214, the communication devices 211 (e.g., RF signal transmission, wired connection, etc.).

Figure 5:
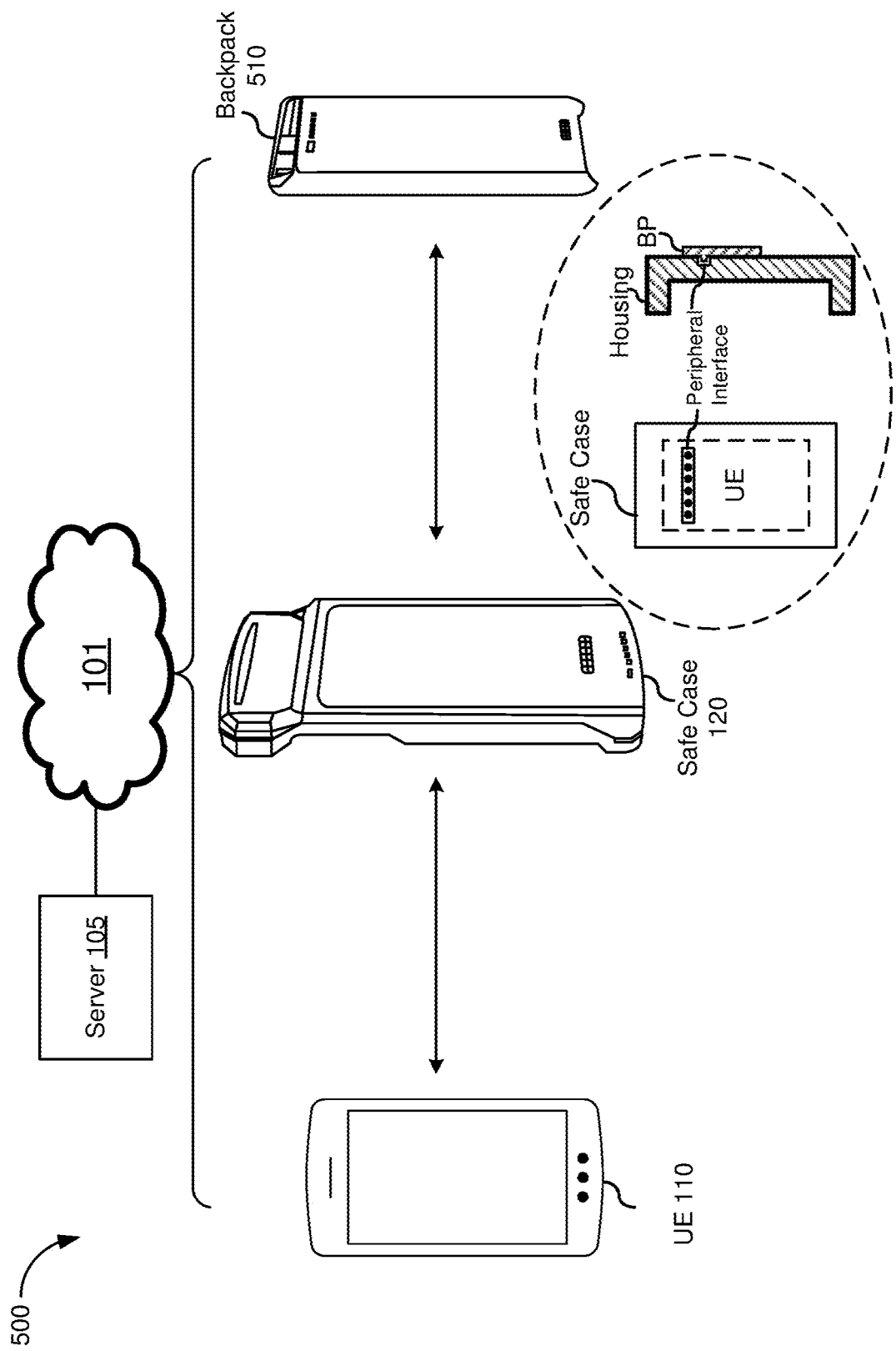
FIG. 5 is a diagram illustrating secure apparatus enabled modular secure feature expansion in accordance with some embodiments.

FIG. 5 illustrates secure apparatus enabled modular secure feature expansion in accordance with some embodiments. In some embodiments, the safe case 120 includes a peripheral interface 150 (e.g., a backpack interface) to connect to a supplemental functional device 510 (also referred to hereinafter as a "backpack"). A supplemental functional device, as described herein, is a device connectable to the UE 110 through the safe case 120 and provides supplemental functional functions to the UE 110. In some embodiments, the supplemental functional device 510 is a modular and detachable device. In some embodiments, the supplemental functional device 510, which is a distinct device from the UE 110 and the safe case 120 and has its own housing, snaps onto the back of the safe case 120 in order to be connected to the safe case 120 for added functionality.

The supplemental functional device 510 provides additional hardware and software functionalities to the UE 110 and/or the safe case 120. As such, the supplemental functional device 510 supplements the functionality of the UE 110 and/or the safe case 120. In some embodiments, the resources providing the supplemental functionality on the supplemental functional device 510 are also referred to as off-device resources. For instance, the supplemental functional device 510 can include sensors and/or processors for detecting odor, RF energy, biometric markers, etc. In another example, the supplemental functional device 510 can include a communication component for translating and relaying communication messages and acts as a proxy for the UE 110 and/or the safe case 120.

In some embodiments, the supplemental functional device 510 is connected to the safe case 120 through its peripheral interface, which is connectable to the peripheral interface on the safe case 120. In some embodiments, the peripheral interface connects the supplemental functional device 510 to the safe case 120 and the communication device 140 (FIG. 1) further connects the peripheral interface to the UE 110. To enable the connection to the supplemental functional device 510, the housing of the safe case 120 at least partially supports the peripheral interface.

For example, the peripheral interface can include a number of connectors (e.g., contact pins or contact pads as indicated by the dots) connectable to the supplemental functional device 510. In some embodiments, the connectors are affixed to the housing of the safe case 120 and at least partially supported by the housing. The connectors are mateable to the interface of the supplemental functional device 510. In some embodiments, the peripheral interface is wholly supported by the housing of the safe case 120, such that the peripheral interface is integrated with or embedded in the housing surface. In such embodiments, connectors from the supplemental functional device 510 can be plugged into the peripheral interface in order to connect the supplemental functional device 510 to the safe case 120. In some embodiments, the peripheral interface is operable to communicate with the supplemental functional device 510 via a physical channel established through the connectors. The physical channel forms a secure channel for communication between the safe case 120 and the supplemental functional device 510.

It should be noted that the peripheral interface is not limited to physical connectors, in some embodiments, the peripheral interface is a wireless interface. In some embodiments, the peripheral interface includes a wireless modem operable to wirelessly communicate with the supplemental functional device 510. In some embodiments, the peripheral interface leverages the wireless communication capability of the communication device 140 (FIG. 1) to communicate with the supplemental functional device 510. For example, the safe case 120 can connect to a wireless communication enabled supplemental functional device 510 through a wireless peripheral interface or through a wireless modem of the local communication device 140 (FIG. 1). As such, a wireless communication-enabled supplemental functional device 510 can communicate with the safe case 120 without being in contact with the housing or physically connected to the peripheral interface. Further, it should be noted that at least some components of the supplemental functional device 510 can be integrated into the safe case 120 or vice versa. Accordingly, at least some supplemental functions provided by the supplemental functional device 510 can also be provided by the safe case 120.

As shown in FIG. 5, the safe case 120 enables secure feature expansion when adding modules to the integrated platform. Different from previously existing systems, where swappable parts may introduce security risks, during the platform integration, the safe case 120 maintains control over security in the integrated platform. Once the backpack 510 is attached to the safe case 120 and the UE 110 is inserted into the housing of the safe case, three parallel platforms 110, 120, and 510 are integrated into a secure platform. The safe case 120 manages both the control plane and the data plane of the integrated platform and leverages its security features (e.g., the root of trust, authentication, data collector, secure communication of data) to ensure the integrated platform is secure.

For example, the safe case 120 can validate the backpack 510 prior to delegating certain tasks to the backpack 510 for security enhancement. For the protection of the storage on the UE 110 (e.g., the storage on the mobile device in FIGS. 2, 3A-3D, and 4A-3D), the safe case 120 can direct the backpack 510 to detect whether or not the data in the storage have been transmitted to a remote source. In some embodiments, under the management of the safe case 120, three platforms coordinate the monitoring, e.g., by obtaining communication status and/or identity information from the UE 110 and passing the identity information to the backpack 510 for decoding communications to or from the UE 110. In the case of detecting abnormal activities based on the decoded communication and/or the communication status, the safe case 120 can take action to protect the data in the storage on the UE 110, e.g., shutting down UE 110 and/or not allowing access to the data in the storage on the UE 110, etc.

FIG. 6 is a simplified block diagram of an integrated secure platform 600 in accordance with some embodiments. In some embodiments, the integrated secure platform 600 for biometric authentication includes the secure server 105 (e.g., a secure server providing Software as a service (SaaS)). In some embodiments, the secure server 105 includes machine learning tools, policy repositories, and/or a storage for storing aggregated data obtained from a plurality of edge devices and/or platforms.

In the exemplary integrated secure platform 600, each UE 110 can be slid or inserted into a housing of the corresponding safe case 120 so that the UE platform 110 can be integrated with the safe case platform 120 as described above to form a secure edge platform. Further, the safe case 120 coordinates data transmission to the secure server 105 so that the secure server 105 obtains aggregated data and facilitates security enhancement on the edge platforms, e.g., authentication, authorization, access control, policy-based device configuration, geo-fencing, etc. As such, the safe case 120 enables secure platform integration not only at the edge, but also the integration of edge devices into a network of secure platforms.

Edge devices may have limitations on security and usability over time. By integrating the edge devices into the network of secure platforms as shown in FIG. 6, the safe case 120 allows improved reliability, lower integration risks, and provides supports for a variety of use cases. Further, as described above, with sensors, communication devices, and/or attachable backpack modules, the safe case 120 augments the sensing abilities (e.g., users, settings, and threats) of the UE platform 110. By integrating with the security features on the UE platform 110, the safe case 120 and the UE 110 collaborates on joint sensor data sharing and lock-down mechanisms. The integrated edge platform can provide fine-grained on-device protection and security analytics as well as controls. The result is a unified platform with enhanced data plane and control plane security. Thus, the safe case 120 establishes a security bridge between the hardware, firmware, and/or software on the safe case 120 and the UE 110 to extend the security features to the integrated platform.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A system comprising: an apparatus providing a first platform and a personal communication device providing a second platform, wherein the second platform is distinct from the first platform, the second platform has a plurality of layers including at least one layer between a hardware layer and high level layers;
   wherein the apparatus includes:
   one or more communication devices; a key store for storing encryption keys;
   a crypto engine that is operable to use the encryption keys for cryptographic operations; and
   a controller that is operable to, via the one or more communication devices, exchange encrypted messages prepared or processed by the crypto engine with the second platform, wherein the encrypted messages control one or more of a hardware unit in the hardware layer and a component in the high level layers, including one or more of initializing a bootloader layer coupled with the hardware layer and the component using one or more of the encryption keys.

2. The system of claim 1, wherein controlling the one or more of the hardware unit in the hardware layer and the component in the high level layers includes enabling, disabling, supplementing, or replacing at least one feature of the one or more of the hardware unit and the component via the encrypted messages facilitated by the at least one layer.

3. The system of claim 1, wherein:
   the component in the high level layers include a secure application communicatively coupled with the first platform; and
   the encrypted messages include at least one message passing through the secure application to communicate with the at least one layer.

4. The system of claim 1, wherein:
   the encrypted messages include at least one message passing through a virtual machine to communicate with the at least one layer.

5. The system of claim 1, wherein:
   the encrypted messages include at least one message passing through a communication device of the one or more communication devices to communicate with the at least one layer without transiting through a layer of the higher level layers.

6. The system of claim 1, wherein:
   the encrypted messages include at least one message directing the at least one layer to control or monitor a communication device in the hardware unit on the personal communication device, including disabling the communication device or redirecting communications associated with the communication device.

7. The system of claim 1, wherein:
   the apparatus further includes sensors operable to obtain sensor data independent of device sensors of the hardware unit on the personal communication device in the second platform; and
   controlling the one or more of the hardware unit and the component includes controlling or disabling the device sensors, including using the sensor data to perform one or more of replacing, verifying, and supplementing the device sensors.

8. The system of claim 7, wherein:
   the device sensors on the personal communication device collect a first set of identity trait data associated with a user of the second platform;
   the sensors are further operable to obtain a second set of identity trait data of the user for independent authentication of the user by the first platform.

9. The system of claim 1, wherein:
   the cryptographic operations include using at least one of the encryption keys for validating an application in the high level layers.

10. The system of claim 1, wherein:
    the encrypted messages include at least a first message directing the at least one layer to obtain operational status from the high level layers and communicate the operational status to the apparatus via the one or more communication devices.

11. The system of claim 10, wherein:
    the controller is further operable to report to a server, via a remote communication device of the one or more communication devices or via the personal communication device, the operational status.

12. The system of claim 11, wherein:
    the controller is further operable to receive from the server, via the remote communication device or the personal communication device, configurations of the personal communication device, wherein the server determines the configurations based on aggregated operational status from a plurality of apparatuses; and
    the encrypted messages include at least a second message directing the at least one layer to enforce the configurations in one or more of the hardware layer and the high level layers.

13. The system of claim 11, wherein:
    the controller is further operable to detect the remote communication device or the personal communication device disconnecting from the server; and
    controlling the one or more of the hardware unit in the hardware layer and the component in the high level layers includes enforcing the configurations in one or more of the hardware layer and the high level layers.

14. The system of claim 1, wherein:
    the hardware unit includes a processor; and
    the encrypted messages include at least a message directing the processor to offload at least a portion of processing on the second platform by the processor to be executed on the first platform.

15. The system of claim 1, wherein:
    the hardware unit includes a storage for storing application data from the second platform; and
    the encrypted messages include the application data to be accessed and modified by the first platform.

16. The system of claim 1, wherein:
the cryptographic operations include using the one or more encryption keys to form an outer layer of a secure tunnel used by the second platform to communicate with a remote source, an inner layer of the secure tunnel is formed between the personal communication device and the remote source.

17. The system of claim 1, wherein the apparatus further includes a housing at least partially supporting the one or more communication devices, the key store, the crypto engine, and the controller.

18. The system of claim 17, wherein the housing is arranged to hold the personal communication device.

19. An apparatus providing a first platform comprising:
one or more communication devices;
a key store for storing encryption keys;
a crypto engine operable to use the encryption keys for cryptographic operations;
a controller operable to, via the one or more communication devices, exchange encrypted messages prepared or processed by the crypto engine with a second platform provided by a personal communication device, wherein the second platform is distinct from the first platform and has a plurality of layers including at least one layer between a hardware layer and high level layers, and the encrypted messages control one or more of a hardware unit in the hardware layer and a component in the high level layers including initializing one or more of a bootloader layer coupled with the hardware layer and the component using one or more of the encryption keys; and
a housing arranged to at least partially support the one or more communication devices, the key store, the crypto engine, and the controller.

* * * * *